Aug. 10, 1937.　　　　F. M. CLARK　　　　2,089,683
ELECTRICAL CAPACITOR
Filed Nov. 30, 1934

Inventor:
Frank M. Clark,
by Harry E. Dunham
His Attorney.

Patented Aug. 10, 1937

2,089,683

UNITED STATES PATENT OFFICE 2,089,683

ELECTRICAL CAPACITOR

Frank M. Clark, Pittsfield, Mass., assignor to General Electric Company, a corporation of New York Application November 30, 1934, Serial No. 755,425

13 Claims. (Cl. 175—315)

The present invention is concerned with electrical capacitors or condensers and its object is to improve the operating efficiency and reliability of such devices.

It has been suggested heretofore to employ, as relatively dilute aqueous solutions, acids and salts in combination in electrolytic devices. The advantages of using the acid itself in concentrated form as the solvent and suspending agent for a salt, heretofore have not been appreciated, nor have such combinations been used in thin layers or films between the armatures of capacitors.

In accordance with my invention the spaces between the armatures of capacitors (which may comprise closely spaced metal foils separated by a layer of porous material) are filled with a concentrated water-soluble organic acid containing in solution or suspension a finely-divided solid material of good dielectric property which functions as an ionogen.

Figure 1:
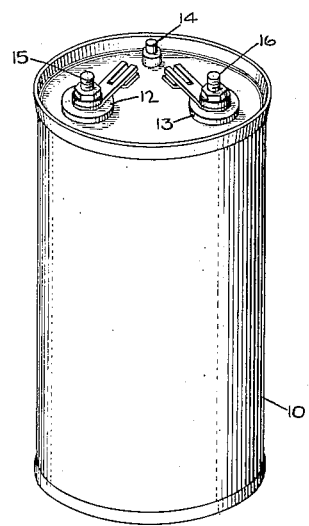
Figure 2:
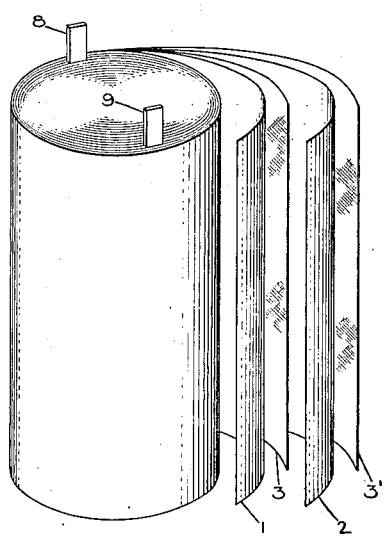
Figure 3:
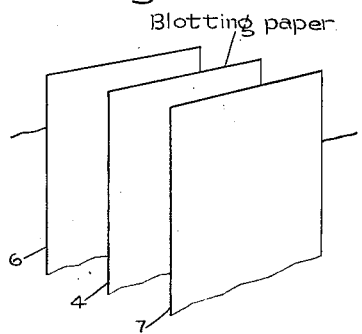
Figure 4:
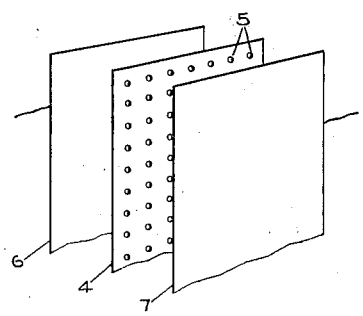

My invention will be more fully explained in connection with the accompanying drawing in which Fig. 1 is a perspective view of a completed capacitor; Fig. 2 illustrates a roll type of capacitor shown partly unrolled; and Figs. 3 and 4 are diagrammatic representations of stacked capacitors.

While my invention has been described with particular reference to an impregnating mixture containing acetic acid, the finely divided solid being ammonium borate, various other concentrated organic acids and other resistance-modifying agents may be used. Propionic, acrylic, lactic, and butyric acids are examples of other aliphatic acids which are suitable for use in accordance with my invention. Such acids are straight chain aliphatic acids having a maximum of four carbon atoms in the molecule. Aromatic or cyclic type acids, such as cresylic acid (cresol) and carbolic acid (phenol) likewise may be used. The following salts may be used in combination with an organic acid: ammonium acid borate, sodium borate, sodium potassium tartrate (Rochelle salt), ammonium phosphate, sodium acetate, and ammonium acetate.

Referring to the drawing, the capacitor illustrated by Fig. 2 comprises armatures or electrodes 1, 2 of suitable metal, for example, aluminum, tantalum, or magnesium. The capacitor armatures ordinarily consist of aluminum foil having a thickness of about .001 to .003 inch. Between them is located a porous spacer 3 of imbibitory material, such, for example, as cheesecloth or porous paper, which is impregnated or filled with the acid during the fabrication of the capacitor. In the drawing two spacers 3 and 3' have been shown, the capacitor of Figs. 1 and 2 being of the rolled type and it being desired that the spacer should be present in all cases between adjacent turns of the wound-up strip armatures.

The spacers 3, 3' which preferably consist of cheesecloth should be free from chlorides, and may have a thickness between the limits of about .0025 and .0055 inch, although this thickness is not critical. The thread count can be varied over a wide range. I have found cheesecloth having a thread count of 40 x 44 to be satisfactory. A paper spacer having a porosity similar to that of blotting paper may be used as shown at 4, Fig. 3. The thickness of the paper may be between the limits of .00075 and .001 inch. The spacer may be perforated, that is, provided with closely placed holes as shown at 5, Fig. 4. It has been determined that paper containing one m. m. diameter perforations spaced 1 to 2 m. m. apart is satisfactory. A spacer is not an absolutely essential part of the present invention and may be omitted, the composition being spread on the electrodes. Its use, however, is recommended.

Before the electrodes are assembled a film of oxide may, and preferably should, be produced thereon, preferably by electrolytic treatment in accordance with well understood practice. While the electrodes commonly consist of lengths of thin metal foil as shown in Fig. 2, it is permissible to use plates which may be flat, as indicated at 6, 7, in Fig. 3, or of corrugated, or other form. The spacer may be perforated as shown in Fig. 4.

A suitable electrolyte is employed for the preliminary electrolytic oxidation treatment. For example, a solution made by dissolving 80 parts of boric acid and 2 parts of borax by weight in 1000 parts of distilled water is suitable. These constituents may be varied considerably without seriously affecting the results. The oxidation treatment can be carried out entirely in one container, or the electrode material when consisting of long strips of foil, can be traversed successively through a series of electrolytic baths in different containers, the baths increasing in concentration as the foil progresses from the first to the last bath.

Preferably the electrolyte is heated during the forming process, a temperature of about 90 to 95° C. being suitable. The voltage at which the electrolytic treatment is carried out preferably should be equal to or not more than about ten per cent greater than the voltage at which the completed capacitor is intended to be operated. For capacitors desired for alternating current operation the treatment of the foil, plates, or other form of electrodes, may be carried out either with alternating or direct current. Preferably direct current is used, employing a voltage equal to or slightly exceeding the peak of the alternating current voltage at which the capacitors are intended to be operated. Aluminum foil intended for operation in the completed capacitor with 110 volt alternating current may be oxidized by direct current treatment, the foil being made the anode and a voltage of 160 volts being applied between anode and cathode.

The rate of the passage of the foil through the electrolyte and the amount of current depends upon the conditions as well understood. Ordinarily a foil when the oxidizing treatment has been completed should not pass more than one ampere per square foot at 160 volts, direct current, while immersed in electrolyte as above described and at a temperature of 95° C. After the foil has been oxidized, it may be dried and stored in a dry environment until it is desired for use.

The capacitors are assembled in accordance with well understood practice; for example, by rolling (Fig. 2), or stacking (Figs. 3 and 4), the oxidized foil and the spacer being in proper relation. While it is necessary in capacitors intended for alternating current use to have both armatures filmed or oxidized, it is sufficient when the capacitors are intended for direct current use to have but one foil or armature (the anode) provided with an oxide film. The cathode need not be oxidized and in fact may consist of any metal inert with respect to the electrolyte. Electrical connections are made to the respective armatures in accordance with well understood practice as by folding back one end of each foil and attaching to it strips 8 and 9 of desired width, for example, about one-half inch, to make electrical connection to exterior terminals.

When acetic acid is used as the impregnating material, it is used preferably in the anhydrous state (glacial acetic acid); although the presence of a small amount of water is not excluded in all cases. In a copending application, Serial No. 755,428 filed Nov. 30, 1934, claims have been made on electric capacitors containing a water-soluble, organic acid, such as acetic acid, and a substantial amount (up to about 15 per cent) of water.

When it is desired to prepare ammonium acid borate as a preliminary step in the fabrication of the capacitor, then about 250 grams of boric acid are triturated in 67 c. c. of concentrated aqueous ammonium hydroxide containing about 29% $NH_3$, thereby forming fine crystals of the borate. The trituration of this mixture is continued for a sufficient period of time to cause such fineness of subdivision of the crystalline product ($NH_4HB_4O_7$) that when it is added to the acetic acid, or whatever other organic acid is used, a slow settling, freely flowing, milky suspension results. The ammonium borate may be formed by suspending boric acid in proper amount in the acetic acid and passing in gaseous ammonia while stirring. Chloride-free ammonium borate of commercial source may be used. About 1 gram molecule of the borate may be suspended in approximately 3.7 gram molecules of acetic acid, but on the other hand the amount of salt may be reduced to the amount going wholly into solution. Such a mixture contains free or uncombined acid, regardless of whether or not an undissolved excess of salt is present.

When anhydrous impregnating material is desired the mixture of acid and resistance-modifying agent may be heated to about 100° C. while stirring to drive off water. Ordinarily heating from 100 to 110° C. for at least fifteen minutes will produce an anhydrous condition. Preferably the described combination of acetic acid and the salt is a turbid slowly settling suspension, some of the salt being dissolved in the acid.

When the condenser assembly is to be impregnated either one of two alternative methods may be used. In accordance with one method, the condenser assembly including the porous spacer is immersed in the electrolyte such as above prepared. During the impregnation the electrolyte may be heated to temperatures above room temperature and as high as 100° C. After about one hour immersion in the impregnating liquid at this temperature, the capacitor is subjected for about one hour at the same temperature while in the liquid to intermittently or continuously applied voltage. The voltage may be applied for about five seconds and then discontinued for about five seconds. The object of this treatment is to "cure" any defective or unoxidized spots on the aluminum as may occur occasionally at edges or elsewhere. It is desirable that this curing treatment be carried out at a temperature at least about as high as 60 to 75° C. but not higher than 100° C.

While alternating current application of voltage is preferred at this stage, direct current application may be used. For example, in the case of a condenser rated for operation at 110 volts alternating current, the curing treatment may be carried out at 160 volts direct current. When employing direct current it is necessary to reverse the polarity at intervals, say once each twenty seconds. When alternating current application is employed, then the curing treatment may be carried out at the voltage at which the capacitor is intended to be operated, that is, its rated voltage. When direct current voltage is used, it should equal in value the peak alternating current operating voltage. During the immersion and voltage treatment period, the acid impregnating mixture when containing suspended crystals, is stirred sufficiently to maintain a substantially homogeneous suspension of the crystals.

In accordance with the second method of impregnation, the capacitor assembly while in a dry state is impregnated with a concentrated water solution of the salt (for example, ammonium acid borate) and thereupon the water is evaporated, leaving crystals of the salt in the fabric, or paper, between the capacitor armatures. The dried capacitor assembly then is immersed in the chosen concentrated organic acid. In this case the acid likewise may be saturated with the salt and may contain an excess or undissolved portion of such salt in finely divided form.

A voltage treatment similar to the first described method of capacitor impregnation then is applied. Upon completion of the voltage "curing" treatment the capacitors may and preferably should be given a further soak in the impregnating mixture for a period from ½ to 1 hour. This further treatment insures stability in electrical characteristics.

After the capacitor has been impregnated it is cooled to room temperature while still being immersed in the acid impregnant. When the impregnation has been completed each capacitor assembly has its voids filled with the acid impregnant.

After having been cooled the capacitors are sealed in a container 10, Fig. 1, which may consist of aluminum, and which is suitably insulated from the filling liquid. This may be accomplished by crimping on an aluminum top provided with insulating bushings 12 and 13. A breather vent 14 to avoid excess internal pressure may be provided. However, the treated condenser assembly may be totally surrounded in its container by wax which preferably should have a melting point between about 75 to 100° C., and should be unaffected chemically by the acetic acid, or other liquid filler. A second topping layer of sealing compound may be applied consisting, for example, of a high melting asphalt. External contacts, or terminals 15 and 16 are provided as usual.

In accordance with an alternative method of sealing the capacitor elements, after impregnation and voltage treatment, they are removed at approximately 50° C. and dipped into a wax or compound which melts at a temperature approximating 75 to 100° C. and is not soluble in the impregnating liquid. By this treatment the capacitor assembly is encased in wax or compound. The assembly so encased then may be put either singly or in groups into a container which is finally filled with the same wax or compound and if desired given a final high melting top seal.

Capacitors prepared in accordance with my invention possess both high capacity and low power factor. The capacity of such capacitors or condensers is higher than that of present commercial forms of electrolytic capacitors. For example, at 110 volt alternating current service such electrolytic capacitors require about 8½ to 9 square inches of armature surface for one microfarad capacity, whereas the herein described capacitors require from 7 to 7½ square inches of armature surface of one microfarad capacity. The power factor of the acetic acid capacitor at room temperature is as low as 3 to 5% for 110 volt service or even lower. No discontinuity in electrical characteristics is observed over a wide range of temperature even if the range of temperature should include the freezing point of the organic acid employed in such capacitors. For example, the freezing point of acetic acid is 17° C. and both the power factor and capacity show only a very slight temperature variation over a range of minus 40° C. to plus 100° C.

While acetic acid has been particularly emphasized as suitable as a "mother liquid" for the purposes of my invention, various other liquid acids of suitable resistivity (preferably below $1 \times 10^8$ ohms per centimeter cube) may be used. Chemical derivatives of acids may be used as represented by lactic acid, hydroxy acrylic acid, crotonic acid, ethylene lactic acid and dihydroxy propionic acid.

Other examples are isobutyric acid, diethyl acetic acid, iso-amyl acetic acid and iso-butyl acetic acid. In general all these acids are characterized by water-solubility in varying degree. The electrical resistivity of the acid mixture should be less than $1 \times 10^6$ ohms per centimeter cube. While I do not wish to have my invention limited by any particular theory of operation, I may say that I believe the acid impregnant functions as an electrolyte. While for purposes of illustration I have referred to a particular capacitor assembly comprising oxidized aluminum foil and a cheesecloth or paper spacer, I do not desire it to be understood as being limited to this particular structure.

What I claim as new and desire to secure by Letters Patent of the United States is:

1. An electric capacitor comprising the combination of film-forming capacitor armatures, a porous spacer therebetween, and an impregnant consisting substantially entirely of water-soluble organic acid in an uncombined state and a resistance-modifying agent, and having electrical resistivity less than $1 \times 10^6$ ohms per centimeter cube.

2. An electric capacitor comprising the combination of film-forming capacitor armatures, a porous spacer therebetween, an electrolyte comprising a substantially anhydrous, water-soluble liquid organic acid and a salt filling voids in said spacer, said electrolyte having electrical resistivity less than $1 \times 10^6$ ohms per centimeter cube.

3. An electric capacitor comprising the combination of film-forming capacitor armatures, a porous spacer therebetween, and concentrated acetic acid containing a salt in suspension filling voids in said spacer.

4. An electric capacitor comprising the combination of film-forming capacitor armatures, a porous spacer therebetween, and consisting of substantially anhydrous acetic acid filling voids in said spacer, said acid containing an excess of salt.

5. An electric capacitor comprising the combination of film-forming capacitor armatures, a porous spacer therebetween, and a void-filling liquid composition comprising ammonium borate and a chemical excess of acetic acid.

6. An electric device comprising the combination of closely adjacent armatures, at least one of which is film-forming, a porous spacer therebetween, and an electrolyte consisting substantially wholly of a water-soluble organic acid and a resistance-reducing solid material filling voids in said spacer, said electrolyte having electrical resistivity less than $1 \times 10^6$ ohms per centimeter cube, the acid in said electrolyte being present in substantial excess in an uncombined state.

7. An electric capacitor comprising the combination of film-forming armatures, a spacer therebetween and concentrated, uncombined crotonic acid permeating said spacer, said acid being associated with a resistance-modifying material.

8. An electric capacitor comprising the combination of aluminum armatures, a porous paper spacer therebetween and concentrated uncombined crotonic acid permeating voids in said spacer, said acid containing sufficient resistance-modifying material to cause the resistivity thereof to be less than $1 \times 10^6$ ohms per centimeter cube.

9. An electrolyte suitable for use with film-forming electrodes consisting of the combination of a concentrated, substantially anhydrous aliphatic acid having a maximum of four carbon atoms in the molecule and a resistance-modifying salt.

10. An electrolyte suitable for use with film-forming electrodes consisting of anhydrous acetic acid and a finely-divided salt.

11. An electrolyte suitable for use with film-forming electrodes consisting of the combination of a concentrated, substantially anhydrous acid of the group consisting of acetic, water-soluble acetic acid derivatives, propionic, butyric, acrylic, hydroxy acrylic, crotonic, lactic, ethylene lactic, cresylic and carbolic acids and a resistance-modifying salt.

12. An electrolyte suitable for use with film-forming electrodes consisting of the combination of a concentrated, substantially anhydrous water-soluble organic acid and a salt of the group consisting of ammonium acid borate, sodium borate, sodium-potassium tartrate, ammonium phosphate, sodium acetate, and ammonium acetate.

13. An electric capacitor comprising the combination of film-forming armatures, a porous spacer therebetween and an impregnant consisting substantially of water-soluble, aliphatic acid in an uncombined state and a resistance-modifying agent, said impregnant having electrical resistivity less than $1 \times 10^6$ ohms per centimeter cube.

FRANK M. CLARK.